UNITED STATES PATENT OFFICE.

LEONARD WRAY, OF LONDON, ENGLAND.

IMPROVEMENT IN DEFECATING CANE-JUICE.

Specification forming part of Letters Patent No. 17,713, dated June 30, 1857.

*To all whom it may concern:*

Be it known that I, LEONARD WRAY, of the city of London, in the United Kingdom of Great Britain and Ireland, have discovered a new process or method of making crystallized sugar, sirup, and molasses from all the African and Chinese varieties of the *Imphee* or *Holcus saccharatus*, of Linnæus, often denominated "Sugar-Millet," "*Sorghum saccharatum*," "*Sorgho sucré*," &c., and which process is also applicable to the manufacture of the same products from the juice of the maize, broom-corn, the sugar-maple, &c., of which the following is a specification.

The process constituting my said invention may thus be stated: I take the stalks of the said plants and obtain the juice contained in them by any ordinary and well-known method. This raw saccharine juice I then treat with lime or cream of lime until it has lost all trace of acidity, and even become sufficiently alkaline to affect in a slight degree turmeric paper or other equally-sensitive test-paper, when I at once remove the said juice into a suitable filtering or other apparatus for separating the feculencies or coagulated matters from the juice, so as to obtain a clear, bright liquor or juice without having subjected it to any heat whatever. This clear, bright juice or liquor I then put into a suitable vessel and apply heat until the temperature rises from 120° to 180° Fahrenheit, when I treat it with a dilute infusion of powdered nut-galls or other substance containing tannin, neutralizing any excess of tannin which may have been accidentally given, or any acid which may have been liberated, by the addition of a little lime, cream of lime, or lime in any other suitable combination. I then urge the heat until the liquor has arrived at the boiling-point, at which it should be kept for a few moments, when the heat is withdrawn and the liquor is again filtered and rendered clear. This clear defecated liquor is next evaporated, and, if in open pans, the scum is taken off as it rises, and the evaporation is continued, either in open pans or in any low-temperature apparatus, until the liquor is sufficiently concentrated to permit of its granulation or crystallization taking effect in proper receptacles, into which it is placed for that purpose. If it should so happen that the said concentrated juice exhibits a disinclination to granulate or form crystals, then the addition of a few ounces of well-grained dry sugar may be had recourse to, which will immediately cause a granulation of the concentrated sirup.

It must be well understood that I make use of charcoal once, twice, or thrice in the filtration and decolorization of the juice and sirup; or, on the other hand, I do not use it at all, just as I may see fit and expedient. When the new sugar is properly granulated its molasses is separated from it by the usual methods now employed.

It must be distinctly understood that the mere idea of cold filtration is not unknown, because numerous attempts have from time to time been made to filter the raw juice of the sugar-cane before applying heat thereto, and small quantities of lime have even been put into the said raw juice before filtration, in order to prevent the acidification and fermentation of the juice during the filtration, and before it could reach the boilers and be boiled; but my distinct and well-proved method is that of adding lime or cream of lime to the raw juice until it loses all trace of acidity and it becomes sufficiently alkaline to affect slightly the color of turmeric paper or other equally-sensitive alkaline test-paper.

The chemical principle involved in this process I will now explain, so as to demonstrate the very peculiar and distinctive character of my treatment, distinguishing it, therefore, from all other methods.

The juice as it comes from the mill I have always found to be palpably acid. The first effect of the lime, therefore, is to neutralize the juice; secondly, to coagulate by a further addition of lime as large a quantity of the feculencies as possible by saturating the acids which hold them dissolved in the juice. When the lime has in this manner combined with the acids and liberated the feculencies whatever lime may be in excess tends to make the juice alkaline, which the turmeric paper immediately denotes, showing the necessity of instant filtration, which yields a beautiful clean, bright juice without any heat having been used, leaving in the filtered juice, besides the sugar and water, only a little dextrine, caseine, and saline matter. By this simple process a host of troublesome albuminous, glutinous, gummy, waxy, and mucilaginous matters, comprised under the general head of feculencies, are got rid of entirely before they can act injuriously upon the sugar contained in the juice, which they infallibly do the moment we apply heat to the undefecated mass. Having thus obtained this bright raw juice, I next treat it in the manner already specified—with heat, infusion of nut-galls (or other analogous substance containing tannin) and lime, cream of lime, lime-water, or other suitable combination of lime, and then filter, so as to get rid of the dextrine and caseine, or as much of them as is possible, previous to subjecting the juice to continuous heat.

The mere idea of using infusion of nut-galls or other tannic substances in sugar-making is not new, inasmuch as these substances have been recommended and been even tried by W. I. Evans, M. D., of London, in whose work, "The Sugar Planters' Manual," 1847, it may be found at page 101; but it will be at once observed that the manner of employing it or them, as laid down therein by Dr. Evans, is entirely different from my own method, for he applies the infusion of nut-galls to the raw green juice in the clarifier just as it comes from the mill and previous to any other defecation having taken place, whereas I, on the contrary, first defecate the cold raw green juice by means of lime, cream of lime, or other suitable preparation of lime, as hereinbefore set forth, and then filter the said juice so treated, thereby getting rid of the great mass of green feculent matter contained in it, and obtaining a clear, bright, and almost colorless juice or liquor previous to applying any heat whatever and previous to venturing upon the application of the infusion of nut-galls or other tannic substances, thus forming a totally distinct method of using and applying the said tannic substances to the juice.

My process therefore consists, first, in the cold defecation of the raw juice by means of lime, cream of lime, or other suitable combination of lime, immediately followed by filtration, as hereinbefore particularly detailed; and, secondly, the treatment of the clear, bright juice or liquor resulting from this cold defecation with infusion of nut-galls or other suitable tannic substances, aided by heat in suitable vessels and subsequent filtration, as hereinbefore described, together making, as a whole, one plain consecutive process, which I have herein fully and faithfully explained and set forth, and which has never been suggested nor employed by any one else before.

These comprise the whole of my treatment, and I submit that they constitute an entirely distinct and new process, being one whereby excellent crystallized sugar has been and can always be made from the plants I have before named; and I therefore claim the process as herein set forth, and desire to secure the same by Letters Patent.

Washington, D. C., April 22, 1857.

LD. WRAY.

Witnesses:
CHAS. L. ALEXANDER,
THOMAS C. CONNOLLY.